United States Patent

Behr

[15] 3,673,153
[45] June 27, 1972

[54] THERMOSTABLE POLYESTERS AND PROCESS OF PRODUCING SAME

[72] Inventor: Erich Behr, Troisdorf, Germany

[73] Assignee: Dynamit Nobel AG, Troisdorf Postfach, Germany

[22] Filed: March 25, 1970

[21] Appl. No.: 22,689

[30] Foreign Application Priority Data

March 26, 1969 Germany .......................P 19 15 374.3

[52] U.S. Cl..........................260/47 C, 117/230, 260/619 A
[51] Int. Cl..............................................C08g 17/08
[58] Field of Search ................................................260/47 C

[56] References Cited

UNITED STATES PATENTS

| | | | |
|---|---|---|---|
| 3,133,898 | 5/1964 | Keck | 260/47 C |
| 3,216,970 | 11/1965 | Conix | 260/47 C |
| 3,317,464 | 5/1967 | Conix | 260/47 C |
| 3,351,624 | 11/1967 | Conix | 260/47 C |
| 3,546,168 | 12/1970 | Allen | 260/47 C |

OTHER PUBLICATIONS pp. 147– 150 Ind. and Eng. Chem. article by Conix Vol. 51 No. 2 Feb. 1959 TP1A58

*Primary Examiner*—Melvin Goldstein
*Attorney*—Burgess, Dinklage & Sprung

[57] ABSTRACT

Thermostable polyesters of formula (I) wherein $n$ is 40–200, and the carbonyl and carboxy groups on the pheylene radical are in para or meta positions with respect to each other. The polyesters are useful as electrically insulating materials. They are produced by reaction of diacylchlorides of terephthalic or isophthalic acid with 4,4'-dihydroxytetraphenylmethane.

4 Claims, No Drawings

THERMOSTABLE POLYESTERS AND PROCESS OF PRODUCING SAME

Thermostable organic polymers have acquired great importance as industrial working materials. For example, polyesters are known whose synthesis sets out from aromatic dicarboxylic acid halides and 4,4'-isopropylidene bisphenol. Such polyaryl esters are relatively thermostable in comparison with aliphatic polyesters, but for many applications their softening ranges and their decomposition or degradation temperatures are much too low.

There are many references in the literature to polyaryl esters which are derived from aromatic dicarboxylic acids, especially from terephthalic and isophthalic acid, and from 4,4'-dihydroxytetraphenylmethane; see, for example, A. Conix in Ind. Chim. Belg. 22 (1967) 1460, and in Ind. Eng. Chem. 51 (1959) 148, and also V.V. Korshak in Pergamon Press (1965) 486, and in "Berichte der Akademie der Wissensch." USSR 156 (1964) 881. The polyaryl esters reported in these publications have softening points (in the melting block test) of 190° to 270° C when they contain isophthalic acid as the acid component, and of about 300° C when they are derived from terephthalic acid. The long-term temperature stability, which is usually much lower than the softening ranges in high polymers, is rather low in these polyaryl esters, so that materials solidified therefrom do not meet, in many cases, the requirements relating to thermal stresses. Another characteristic of these described polyaryl esters is that they are easily soluble in methylene chloride, 1,2-dichlorethane, 1,2,2-trichloroethane and tetrachlorethane, and in some cases in chloroform, benzene and mixtures of trichlorethane and cresol. Intrinsic viscosities given for these polyesters are 0.34 and 1.0 ml/g for those based on isophthalic acid, and 0.48 ml/g for those based on terephthalic acid. By intrinsic viscosity (also called limit viscosity) in this case is meant the limit of the viscosity number according to DIN 53,726 if the concentration of the solution is extrapolated to zero.

According to U.S. Pat. No. 3,351,624, polyaryl esters based on terephthalic acid and isophthalic acid plus, for example, 4,4'-dihydroxytetraphenylmethane are already known. The synthesis of these polyaryl esters sets out in practice from the alkali compound of the diphenol (alkali phenolate) and from the dicarboxylic acid dichloride involved, and the polycondensation is performed preferably in the presence of a catalyst, using the boundary-surface method. The resulting polyesters are soluble in tetrachlorethane and have an intrinsic viscosity (in tetrachlorethane) of 0.5 to 2.0 ml/g. It has been found, however, that the boundary-surface process which is mentioned in this patent and is applicable to many diphenols is not easily applicable to polyester synthesis in which 4,4'-dihydroxytetraphenylmethane is used as the diphenol, because this diphenol dissolves only in a very great excess of alkali, and products of only very low molecular weights are formed in the polycondensation.

The subject of the present invention is thermostable polyesters of the general formula

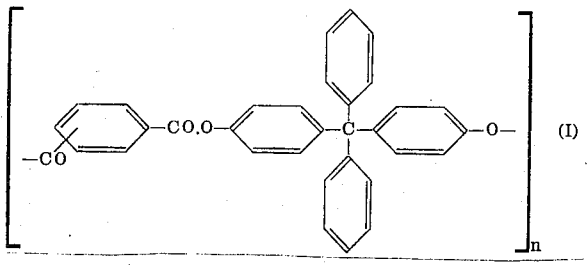 (I)

in which $n$ is a number from 40 to 200, preferably from 80 to 150, and in which the carbonyl and carboxy groups are either in the $p$ position or in the $m$ position—preferably in the $p$ position—in relation to one another on the phenylene radical derived from the aromatic dicarboxylic acid, these polyesters being characterized by insolubility in tetrachlorethane, by intrinsic viscosities in o-dichlorobenzene of 0.8 to 1.4, preferably 1 to 1.2 ml/g, by Vicat softening points per DIN 53,460 in air under 5 kp of 230° to 270° C, preferably 260° to 270° C, and by an oxygen absorption capacity at 250° C of no more than 0.3 mg/g/h, preferably 0.1 to 0.2 mg/g/h.

The preparation of these polyesters, is performed by reaction of terephthalic or isophthalic acid dichloride (the diacylchlorides) with 4,4'-dihydroxytetrapheylmethane, preferably in equimolar amounts, in organic solvents if desired, and in the presence of catalysts if desired, at temperatures between 100° and 250° C, preferably between 150° and 200° C, with the yielding of HCl. However, it is an important condition for the success of the synthesis that an especially pure 4,4'-dihydroxytetraphenylmethane be used, having a melting point of at least 295° C, but preferably above 300° C, e.g. in the range of 300–306, preferably 301°–306° or even better 303°–306° or 303°–305° C, measured in the melting point microscope. A highly pure 4,4'-dichlorodiphenylmethane of this kind is obtained by bringing about a reaction between pure dichlorodiphenylmethane and at least 90 percent and preferably close to 100 percent phenol, in a molar ratio of 1:2 to 2.4. For this purpose the two substances are mixed at room temperature or at a temperature up to 40° C, with stirring, and then heating them, preferably under a vacuum, at a temperature between 105° and 160° C, until the evolution of HCl ceases. To achieve the required purity, the hardened crude product is best treated with a low alcohol ($C_1$ to $C_4$), preferably ethanol. The crystals obtained must then be washed with water and, if desired, with the alcohol, until the eluate becomes colorless. Furthermore, one or more recrystallizations from the alcohol are to be recommended.

The thermostable polyesters of the invention are obtained if the condensation is performed without catalysts. Basically, however, the use of catalysts may be advantageous, especially when special starting products are used. The catalysts can be, for example, tertiary amines, phosphonium salts, sulfonium salts, hydrazinium salts and the corresponding hydroxides and metal acid esters. Also usable are quaternary ammonium compounds, especially the hydrochlorides or the corresponding salts obtained from the halogenated phenols and the tertiary amines. The catalysts are used in quantities of 0.01 to 2 mole percent with reference to the acid halide.

In general, no use will be made of catalysts in the synthesis of the polyesters of the invention, since in most cases it is very difficult to eliminate the catalyst residues from the end product, and the good thermal and electrical properties, which are an outstanding feature of these polyesters, are impaired. The invention thus relates preferentially to polyesters which are obtained by polycondensation without the use of any catalysts. The use of catalysts in the synthesis of useful polyesters, however, can be dispensed with only if very pure starting products are used. If it is desired to use starting products of lesser purity and nevertheless achieve high molecular weights in the polymers, the use of catalysts is necessary. As a result, however, the polyaryl esters produced will be less resistant to oxidative and thermal degradation.

Halogenated hydrocarbons having high boiling points are especially suitable as solvents in the preparation of the polyesters according to the invention, because in this case the polyaryl ester remains in solution until the reaction is ended. Also suitable, however, are a number of aliphatic and aromatic hydrocarbons, especially those having high boiling points. In these solvents, however, the polymers usually precipitate during the reaction. The following substances, for example, can be used: diethylbenzene, tetrahydronaphthalene, decahydronaphthalene, diphenyl, diphenyl ether, mixtures of diphenyl and diphenyl ether, chlorobenzene, dichlorobenzene, trichlorobenzene, chloronaphthalines, nitrobenzene, chlorinated diphenyl, and chlorinated diphenyl ethers.

If the polycondensation is performed in a good solvent such as dichlorobenzene, it is desirable to perform the further working of the dissolved polyaryl ester by directly casting the completely condensed batch solution into sheets or plates, or to use it, if desired, following additional dilution, as a solution for impregnation, coating varnishing, etc. The removal of the solvent is performed by the conventional method used in such processes.

If the polyester is to be obtained in solid form, it is precipitated in a non-solvent such as methanol, acetone or petroleum ether, in which case it precipitates in the form of easily filtrable, asbestos-like clumps which can be easily dried and further worked.

The polyesters claimed according to the invention are pure white when in powder form or asbests-like clumps, and glass-clear in manufactured films, sheets or plates, with a slight yellow-brownish tint in great thicknesses.

The polyaryl esters according to the invention are superior to all polyaryl esters known hitherto as regards their thermal properties and as regards thermal-oxidative resistance. The thermal-oxidative resistance is best learned by determining the oxygen absorbing capacity at 250° C, for example. In a test of this sort, a weighed amount of the fine plastic powder under study is exposed at 250° C to a measured amount of oxygen under normal pressure in a sealed glass vessel. By measuring the remaining amount of oxygen at certain intervals of time, the oxygen consumption per unit of time can be determined and hence the oxygen absorbed by the plastic powder in mg per g of plastic per hour. The oxygen absorbing capacity in the case of polyaryl esters according to the U.S. patent mentioned above amounts to about 0.5 to 1.0 g/mg/h. In the case of the polyaryl esters according to the invention, however, values of 0.1 to 0.2, with a maximum of 0.3 g/mg/h were determined. In this regard the polyaryl esters according to the invention are excelled only by the polymerized fluorinated hydrocarbons.

This thermal-oxidative resistance is particularly pronounced when the polyaryl esters are made without the use of catalysts. Furthermore, the dielectric characteristics of these polyesters are outstanding. It is especially to be stressed that their dielectric characteristics are to a great extent independent of temperature and frequency.

The polyaryl esters according to the invention differ from the polyesters according to U.S. Pat. No. 3,351,627 in still other desirable ways. For example, the polyesters according to the invention are not solube in tetrachlorethane. In a comparison of rheological performance, using o-dichlorobenzene as the solvent, the following results are obtained: the polyesters according to U.S. Pat. No. 3,351,624 have an intrinsic viscosity of about 0.6 ml/g, while the polyesters of the invention have one of 0.8 to 1.4, preferably 1.0 to 1.2 ml/g. The Vicat stability of shape (DIN 53,460) amounts to from 230° to 270° C, preferably 260° to 270° C, for the polyesters of the invention in air under a load of 5 kp.

A melting range of 330° to 390° C is determined in the melting block. The products with a melting point of 350°–380°, better 360°–370° C, are preferred. The glass temperature (second order transformation point) is 260° C, i.e., about 50° to 60° C higher than in the polyaryl ester of the prior art in which 4,4'-isopropylidenebisphenol is used in the preparation instead of 4,4'-dihydroxy tetraphenylmethane.

The differences in the properties of the polyesters according to the invention as compared with those of the polyesters of U.S. Pat. No. 3,351,624 are presumably to be attributed in part to the different degree of purity of the 4,4'-dihydroxytetraphenylmethane from which the synthesis sets out, and partially to the fact that, in the one case the synthesis sets out from the diphenol and in the other case it sets out from the dialkali phenolate.

The mechanical properties of the polyesters according to the invention are the same as those of prior-art polyesters. For example, the tensile strength according to DIN 53,455 runs around 200 to 300 kg/cm² in the case of the isophthalic acid-based polyesters, and around 300 to 400 kg/cm² for the terephthalic acid-based polyesters. The elongation at rupture amounts in both cases to 30 to 50 percent, the modulus of elasticity to 28,000 to 30,000 kp/cm² in the former case and 30,000 to 32,000 kp/cm² in the latter.

A further subject of this invention is high-temperature resistant sheets, films, coatings and impregnations made of the polyesters according to the invention. They are of particular interest to the electrical insulating field since they have good insulating properties and form adherent films on metal surfaces. According to the state of the art, electrical parts such as cables, condensers, coils and the like are covered and insulated with sheets and films made, for example, of polyethyleneterephthalate and polycarbonate. This kind of insulation presents considerable physical disadvantages, so that the use of sheets according to the state of the art is greatly restricted. Many special problems cannot be solved by the use of such insulating sheet materials.

For example, the dielectric loss factor of polyethyleneterephthalate and polycarbonate is too high for many applications. Furthermore, it increases with frequency and with the test temperature for both these high polymers, which is undesirable and troublesome. Sheet materials made from polyimides exhibit the same disadvantageous correlation between the dielectric loss factor and the frequency. Also, the softening characteristics of sheet materials prepared from polyethyleneterephthalates or polycarbonates are relatively unfavorable.

Surprisingly it has been found that sheets, films and the like made from the polyesters according to the invention do not suffer the above-mentioned deficiencies. They have a very low dielectric loss factor, which furthermore is practically independent of frequency. Furthermore, the dielectric characteristics of the material according to the invention are virtually independent of the test temperature. On the basis of the outstanding thermal stability of the material according to the invention, it can be used for electrical insulation even at elevated temperatures.

The insulating means according to the invention are used, on account of these excellent characteristics, in direct-current condensers, transformers, choke coils and printed circuits, to cite a few examples. Also, they can be used as slot liners, slot fillers, splines, and conductor wrappers for motors and generators, and side parts and separators in electrical appliances. Furthermore they can be used for core wrappers and covers for electric wires and cables.

The sheets, films and coatings according to the invention are prepared from solutions of the thermostable polyesters in halogenated hydrocarbons in which the polyesters are soluble, preferably halogenated aromatic hydrocarbons. The concentration of the solutions should best be between 5 and 20 percent by weight. Sheets can be prepared in any desired thickness by the casting process. The solutions can also be sprayed onto supports to form films, in one or more coats, each coat being dried before application of the next.

Not only can sheets and films of the polyesters of the invention be applied to electrical parts to coat them, but the parts can also be directly coated and impregnated with the polyester solution, e.g., by dipping, brushing on or spraying. In all these cases, a drying process follows.

EXAMPLE 1 a. Preparation of 4,4'-dihydroxytetraphenylmethane 188 g of 100 percent phenol (2 moles) and 237 g of pure dichlorodiphenylmethane (1 mole) were mixed together and stirred in a nitrogen atmosphere at 30° C until complete dissolution had been achieved, while the temperature was kept constant. Then the flask, which was equipped with a stirrer and in which the reaction had been performed, was heated by means of an oil bath at an oil bath temperature of 150° C, and after the main reaction had ceased a vacuum was applied by means of an oil [diffusion] pump. Within 20 minutes the mixture had completely hardened. Heating was continued for about another half hour under the vacuum, and then 3 liters of hot ethanol was poured in. After cooling the crystalline mass was suction filtered and washed thoroughly with cold water. Then it was extracted with cold ethanol until the eluate was colorless. The product then had a melting point of 298°–300°

C, and after one recrystallization from ethanol the melting point was 301°–303° C, and after two recrystallizations it was 303°–305° C, and the product was pure white.

Yield 266 g; another 72 g was obtained by extracting the ethanol, so that the total yield was 338 g, or 96 percent.

b. Preparation of the Thermostable Polyester

In a three-necked flask equipped with stirrer, condenser and gas introduction tube, 35.2 g of the 4,4'-di-hydroxytetraphenylmethane (0.1 mole) obtained in (a), and 30.3 g of terephthalic acid dichloride (0.1 mole), were dissolved in 337 ml of o-dichlorobenzene. The resultant solution was heated to the boiling temperature under an infeed of nitrogen and with strong agitation, and was kept at this temperature for 72 hours, while the hydrogen chloride that formed was continuously displaced from the reaction chamber by the nitrogen current and collected in an absorption vessel, and measured by titration. In this manner the progress of the reaction could be followed.

1.5 l of methanol was added to half of the polyester solution that formed, and the polyester was precipitated from it in this manner. After filtration the product was again suspended in pure methanol and further purified by boiling the resultant suspension. After another filtration the end product was dried at 100° C and 10 Torr.

The white product has the following characteristics:

Melting range, determined in the melting block: 360°–370° C

Density: 1.23 g/cm$^2$

Intrinsic viscosity (0.5 wt-% solutions in o-dichlorobenzene, at 20° C): 1.1 (on the basis of the viscosity number according to DIN 53,726)

Behavior on the thermal scale in air:
1 wt-% 400°–450° C
5 wt-% 450°–500° C

The other half of the polyester solution was put into a doctor and spread onto a glass plate. Drying it produced a sheet material which was placed in a vacuum dryer 10 hours later and heated to 180° C. The resultant sheet was transparent and colorless and about 0.1 mm thick. The good electrical characteristics of same are represented in Tables 1 and 2, and compared in Table 2 with the characteristics of conventional materials.

TABLE 1

| Frequency (Hz) | Test Temperature (°C) | Dielectric loss factor tan δ . 10$^4$ | Dielectric constant ε |
|---|---|---|---|
| 10$^3$ | 20°C | 25 | 2.9 |
| 10$^4$ | 20°C | 20 | 2.9 |
| 10$^5$ | 20°C | 24 | 2.9 |
| 10$^6$ | 20°C | 22 | 2.9 |
| 10$^6$ | 20°C | 15 | 2.9 |
| 10$^6$ | 50°C | 20 | 2.9 |
| 10$^6$ | 100°C | 22 | 2.9 |
| 10$^6$ | 150°C | 15 | 2.9 |
| 10$^6$ | 180°C | 17 | 2.9 |

What is claimed is:

1. Thermostable polyesters having the general formula

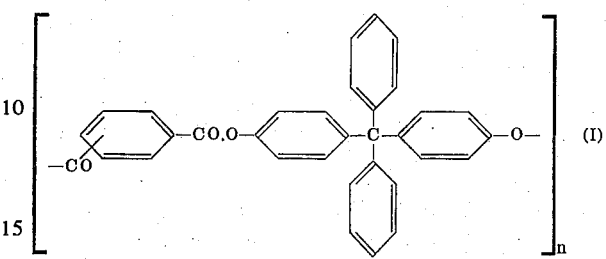

wherein $n$ is 40–200, and the carbonyl and carboxy groups on the phenylene radical are in para or metal positions with respect to each other; said polyester being
   a. prepared from 4,4'-dihydroxytetraphenylmethane having a melting point of at least 295° C.;
   b. insoluble in tetrachloroethane;
   c. having an intrinsic viscosity in o-dichlorobenzene of 0.8–1.4 ml/g;
   d. having a Vicat softening point in air under 5 kp of 230°–270° C; and
   e. having an oxygen absorption capacity of up to 0.3 mg/g/hr.

2. Thermostable polyester according to claim 1, wherein:
   a. $n$ is 80–150,
   b. said carbonyl and carboxy group are in para positions which respect to each other,
   c. the intrinsic viscosity is 1–1.2 ml/g;
   d. the Vicat softening point is 260°–270° C;
   e. the oxygen absorption is 0.1–0.2 mg/g/hr; and
   f. a melting range of 330°–390° C.

3. Thermostable polyester of an acid selected from the group of terephthalic acid diacylchloride, isophthalic acid diacylchloride and mixtures of the foregoing and 4,4'-dihydroxytetraphenylmethane having a melting point of at least 295° C., said polyester being insoluble in tetrachloroethane, having an intrinsic viscosity in o-dichlorobenzene of 0.8 to 1.4 ml/g, a Vicat softening point in air under 5 kp of 230° to 270° C. and an oxygen absorption capacity of up to 0.3 mg/g/hr.

4. Thermostable polyester of claim 3 wherein said 4,4'-dihydroxytetraphenylmethane is prepared by reacting highly pure 4,4'-dichloridephenylmethane and at least 90 percent phenol in a molar ratio of 1:2 to 2.4 at a temperature between 105° and 160° C.

TABLE 2

| Polyester Type | Softening temp., ° C.[1] | Dielectric loss factor tan δ at 1MHz, 20° C. | Dielectric constant ε at 1MHz., 20° C. | Specific volume resistance at 20° C. in ohms | Breakdown strength at 20° C. in kv./mm. | Weight loss, 1 day storage at elevated temperature | | No flammable gases at ° C. |
|---|---|---|---|---|---|---|---|---|
| | | | | | | ° C. | Weight percent | |
| Invention | 290 | 22 . 10$^{-4}$ | 2.9 | 10$^{16}$ | 195 | 250 | <0.1 | 400 |
| Polyethyleneterephthalate | 80 | 200 . 10$^{-4}$ | 3.1 | 10$^{17}$ | 300 | 130 | 0.15 | 400 |
| Polycarbonate | 149 | 90 . 10$^{-4}$ | 2.7 | 10$^{17}$ | 240 | 120 | 1.0 | 400 |

[1] Determined by the torsional vibration test per DIN 53445.

* * * * *